Dec. 9, 1930.  H. RICH  1,784,709
PORTABLE SAWING MACHINE
Filed July 2, 1929   3 Sheets-Sheet 1
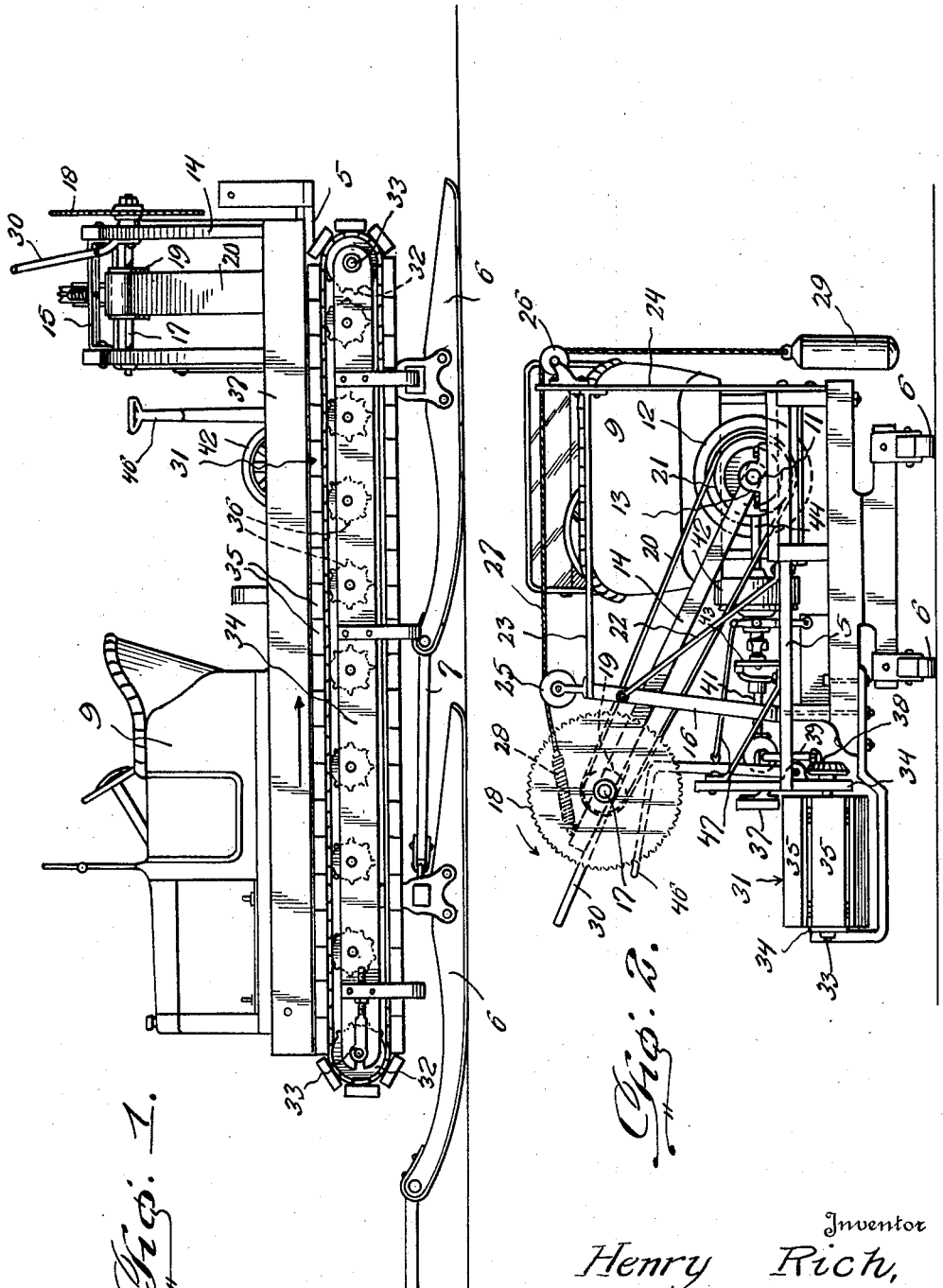
Inventor
Henry Rich,
By J. Stanley Burch
Attorney

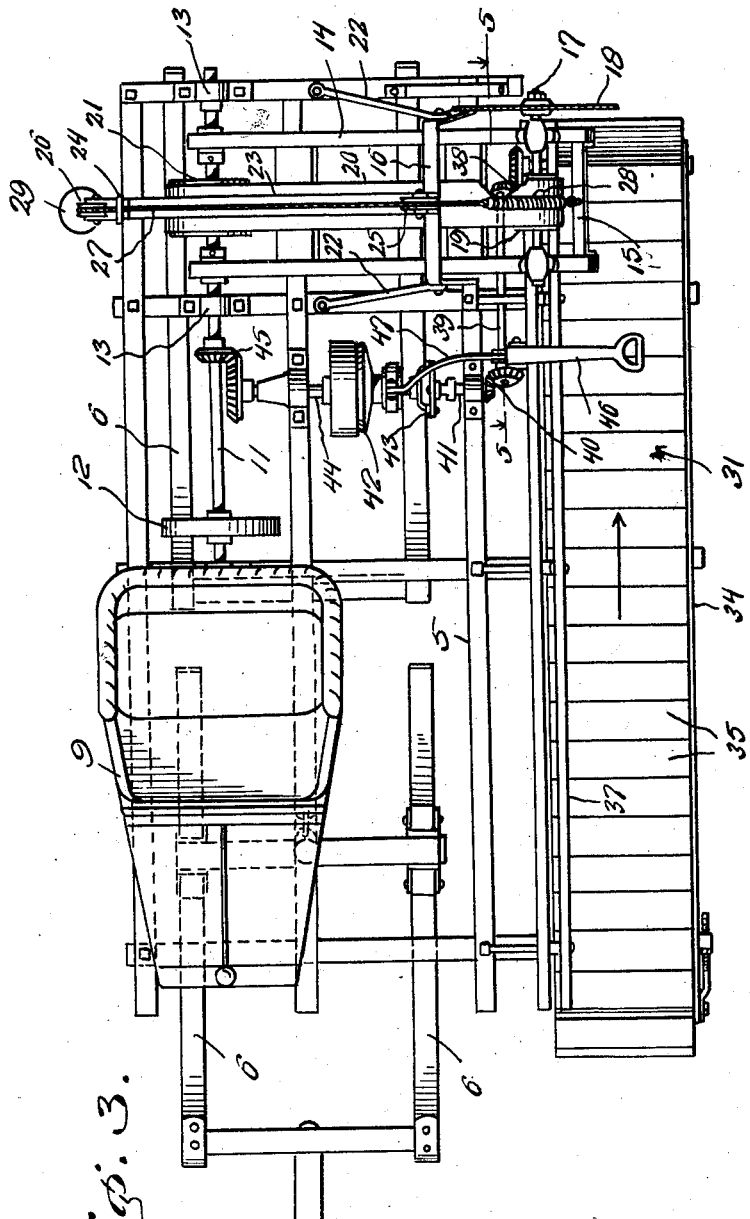

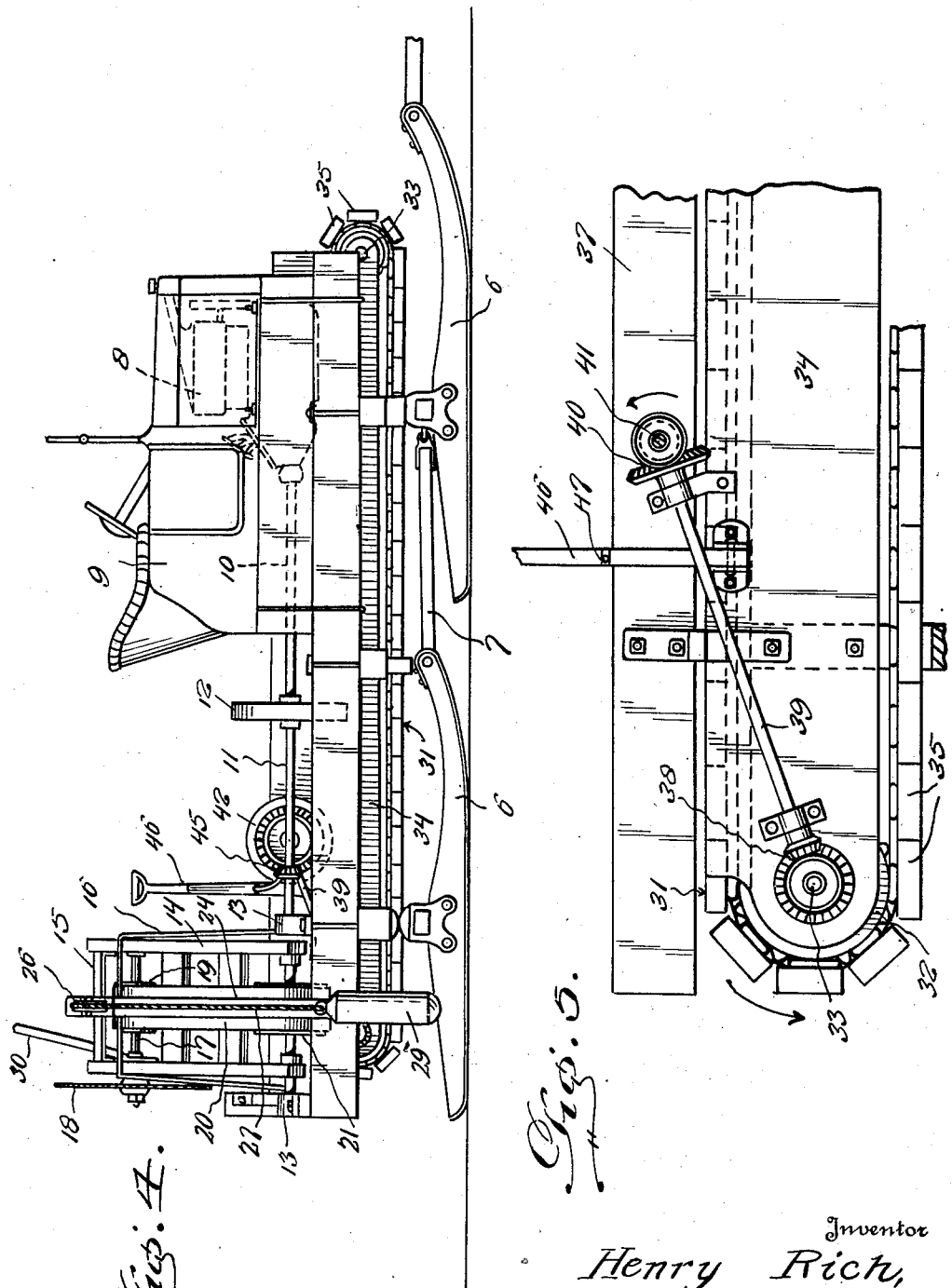

Patented Dec. 9, 1930

1,784,709

UNITED STATES PATENT OFFICE

HENRY RICH, OF ELMO TOWNSHIP, OTTER TAIL COUNTY, MINNESOTA

PORTABLE SAWING MACHINE

Application filed July 2, 1929. Serial No. 375,377.

This invention relates to improvements in portable sawing machines of the type that are adapted to be readily transported to the place at which the timber to be cut into cord wood lengths, or the like, is located.

The primary object of the present invention is to provide a sawing machine of the above kind which is extremely simple in construction, efficient in operation, and capable of convenient use and control for expeditiously cutting logs into sections of the required length.

Other objects are to provide an improved sawing machine of the above kind having means for facilitating feeding of the saw to the work and automatically retracting the saw for the start of a new cutting operation; simple and efficient means for feeding the logs relative to the saw for readily positioning them for each new cut; and simple and efficient means for driving and controlling the saw and the log feeding means.

Other objects will appear as the nature of the invention is better understood, and the same consists in the novel form, combination and arrangement of parts hereinafter more fully described, shown in the accompanying drawings and claimed.

In the drawings:

Figure 1 is a side elevational view of a portable wood sawing machine embodying the present invention.

Figure 2 is a rear elevational view thereof.

Figure 3 is a top plan view of the same.

Figure 4 is a side elevational view looking toward the left of Figure 2 and at the reverse side from that shown in Figure 1; and Figure 5 is an enlarged fragmentary longitudinal section taken upon line 5—5 of Figure 3.

Referring more in detail to the drawings, the present sawing machine preferably embodies a sleigh including a horizontal frame-like platform 5 mounted upon front and rear runners 6 operatively connected by a draw bar 7.

Mounted upon the front end of the platform 5 near one side thereof is a suitable motor indicated by dotted lines at 8 in Figure 4. The motor 8 preferably consists of an internal combustion engine forming part of the power plant of a conventional form of motor vehicle which has its axles removed and is mounted upon the front portion of the platform 5 so that its body 9 furnishes a convenient driver's seat for use when transporting the machine from one place to another. As shown, the automobile body is mounted upon the platform 5 longitudinally of the latter so that the longitudinal propeller shaft 10 of the automobile extends rearwardly for connection with the forward end of a drive shaft 11 alined therewith and having a fly wheel 12 secured thereon for an obvious purpose. The drive shaft 11 has its rear end portion journaled in a pair of spaced bearings 13 secured upon the rear portion of the platform 5, and hinged at one end upon the drive shaft 11 between the bearings 13 is a saw frame 14 consisting of a pair of spaced parallel bars that extend transversely of the platform beyond the opposite side of the latter and have their free ends rigidly connected as at 15. The saw frame 14 is thus mounted for vertical swinging movement, and fixed upon the platform 5 intermediate the ends of the saw frame 14 is an inverted U-shaped guide 16 whose legs are disposed directly at the outer sides of the saw frame 14 to brace the latter against lateral strains while permitting free vertical movement thereof.

Journaled transversely of the free end of frame 14 and disposed longitudinally of the machine is a driven shaft 17 having a rear projecting end upon which is secured a circular saw 18. A pulley 19 is fixed upon the driven shaft 17 between the side bars of the frame 14, and a belt 20 passes about the pulley 19 as well as about a further pulley 21 secured on the drive shaft 11 so that the rotation of the latter will be transmitted to the saw.

The saw frame guide 16 is preferably braced as at 22 in a substantially upright position as shown in Figure 2, and is rigidly connected at the top by means of a horizontal bar 23 with the upper end portion of an upright 24 secured to and rising from the platform 5 intermediate the legs of the guide 16.

Mounted in transverse alinement upon the top of the guide 16 and the upper end of the upright 24 are guide pulleys 25 and 26 over which pass a rope or similar flexible member 27 having one end connected by a tension spring 28 with the free end of the saw frame 14 and having its opposite end depending from the guide pulley 26 and provided with a suspended weight 29. By these means, the saw frame is normally yieldingly swung upwardly to an inoperative position, and the spring 28 absorbs any shock which may be experienced from sudden falling of the weight 29 when the saw frame is released after having been swung downwardly to cut a log. The free end of the saw frame 14 may be provided with a laterally projecting handle 30 for facilitating manual downward swinging thereof in feeding the saw to the work.

Mounted longitudinally of and along the side of the platform 5 adjacent the free end of the saw frame 14 is an endless log-feeding conveyor including a power driven flexible endless conveying element 31. The conveying element 31 preferably consists of a pair of endless sprocket chains passing around sprocket wheels 32 fixed upon shafts 33 journaled at the ends of the conveyor frame 34, said sprocket chains being connected by a series of transverse boards 35 which are closely related to form a substantially continuous platform on which the logs may be placed. Idler sprockets are also provided as at 36 to support the endless conveying element 31 intermediate the end shafts 33.

It is to be understood that the logs are adapted to be placed upon the conveyor longitudinally of the latter for being shifted endwise relative to the saw 18 when it is desired to position the log for a new cut at the completion of each cutting operation. To prevent lateral movement of the log off of the conveying element 31, a guide board 37 is mounted along the adjacent side of the platform 5 at the inner side of the conveyor and above the conveying element 31 of the latter.

The rear shaft 33 of the log feeding conveyor is operatively connected with the drive shaft 11 so as to be driven therefrom, the operative connection including a normally released clutch whereby the conveyor is normally thrown out of operation but manually thrown into operation when desired. For this purpose, the inner end of the rear conveyor shaft 33 is geared as at 38 to the lower rear end of a longitudinally disposed inclined counter shaft 39 journaled at the inner side of the rear end portion of the log feeding conveyor and having its forward upper end geared as at 40 to the adjacent end of a transverse shaft 41 journaled upon the platform 5. The shaft 41 is alined with a further shaft carrying the male member of a clutch 42 and coupled to said shaft 41 by means of a universal joint or flexible shaft coupling 43. A still further shaft 44 is alined with the shaft carrying the male member of the clutch 42, and this shaft 44 carries the female member of the clutch 42 and has one end operatively geared as at 45 with the drive shaft 11. The clutch 42 may be of any well known spring released type by means of which the connection between drive shaft 11 and the conveyor shaft 33 is normally broken so as to allow the conveying element 31 to remain at a stand still. However, manually operable means is provided for engaging the clutch 42 so as to cause the conveying element 31 to be driven in the direction of the arrow of Figures 1 and 3, when desired. This means preferably consists of an angular hand lever 46 pivoted at its lower end upon the inner side of the conveyor frame 34 as shown in Figure 5 and operatively connected by means of a link 47 with the shifting collar of the male member of clutch 42 in a more or less conventional and well known manner as shown in Figures 2 and 3. The angular form of the lever 46 permits positioning of its upper end so as to project laterally and outwardly over the conveying element 31 for convenient actuation by an attendant standing beside the conveyor and adjacent the saw 18.

In using the present sawing machine, it is drawn by draft means to the place where the logs to be cut are piled, whereupon the logs are placed one by one upon the conveyor 31 for being successively cut up into sections of the required length. When a log is placed upon the conveying element 13 parallel with the direction of movement of the latter, the hand lever 46 may be operated to engage clutch 42 and transmit power from shaft 11 to the rear conveyor shaft 33. This will result in shifting of the log rearwardly until a desired portion of the same projects rearwardly of the saw 18. This projecting part of the log is then severed from the rest of the log by swinging the saw frame 14 downwardly as the saw 18 is driven from shaft 11 through the belt drive connection described. At the completion of the cut, the saw frame 14 is released and it is then automatically elevated to an inoperative position by means of the weight and cord 29, 27. It will of course be understood that the log is brought to a rest when fed rearwardly the required distance by throwing the conveying element 31 out of operation, the latter being effected by permitting the clutch 42 to release when the lever 46 is released by the attendant. At the completion of each cut, the log is fed rearwardly to position it for a new cut, and it will thus be apparent that the only manual effort required is to place the log upon the conveyor and to engage clutch 42 or swing the saw 18 downwardly so as to feed it to the work.

From the above description it will be seen that the present sawing machine can be advantageously utilized by farmers and the like in cutting cord wood. It will also be seen that the several parts are readily accessible for inspection and repair, while the construction of the machine is extremely cheap and permits its practical use without skilled labor.

Minor changes may be made without departing from the spirit and scope of the invention as claimed.

What I claim as new is:

1. In a portable sawing machine, a platform having an endless log feeding conveyor along one side thereof, a motor mounted on said platform and having a rearwardly projecting drive shaft, a vertically swinging saw frame pivoted upon the rear portion of said drive shaft and extending transversely of the platform over the rear end of said conveyor, a saw carrying shaft journaled on the free end of said saw frame, a guide for the frame and means for bracing the frame against lateral movement, means to operatively connect said saw carrying shaft to said drive shaft, and means operatively connecting said conveyor to said drive shaft, said last named means embodying a normally released clutch for maintaining the conveyor out of operation and having manually operable means for engaging the same to throw the conveyor into operation.

2. In a portable sawing machine, a platform, a motor mounted upon the forward end of said platform adjacent one side thereof and having a rearwardly projecting drive shaft, log supporting means at the opposite side of said platform, a vertically swinging saw frame pivoted upon the rear portion of said drive shaft and extending transversely of the platform to a point above the log supporting means, a saw carrying shaft at the free end of said saw frame, a guide for the frame and means for bracing the frame against lateral movement, means to operatively connect said saw carrying shaft to said drive shaft, yieldable means to normally swing said saw frame upwardly to an inoperative position, said log supporting means embodying an endless conveyor arranged to shift the logs rearwardly in position for being cut when the saw frame is lowered, and releasable driving connections between the conveyor and said drive shaft embodying a clutch having an operating lever accessible by an attendant standing beside the conveyor and adjacent the saw.

In testimony whereof I affix my signature.

HENRY RICH.